United States Patent
O'Loughlin

[11] Patent Number: 6,020,724
[45] Date of Patent: Feb. 1, 2000

[54] REGULATED CAPACITOR CHARGING CIRCUIT USING A HIGH-REACTANCE TRANSFORMER

[75] Inventor: James P. O'Loughlin, Placitas, N.Mex.

[73] Assignee: The United States of America as represented by the Secretary of the Air Force, Washington, D.C.

[21] Appl. No.: 09/110,520

[22] Filed: Jul. 6, 1998

[51] Int. Cl.[7] .................................................. H02J 7/00

[52] U.S. Cl. ........................................ 320/166; 320/167

[58] Field of Search ...................................... 320/166, 167, 320/149; 363/43, 44, 51, 71, 79, 90; 307/64

[56] References Cited

U.S. PATENT DOCUMENTS

| 4,038,559 | 7/1977 | Chun et al. | 363/90 |
| 5,689,411 | 11/1997 | Chabraya | 363/74 |
| 5,847,944 | 12/1998 | Jang et al. | 363/44 |

*Primary Examiner*—Peter S. Wong
*Assistant Examiner*—Lawrence Luk
*Attorney, Agent, or Firm*—Kenneth E. Callahan

[57] ABSTRACT

A high-reactance transformer is used in combination with a phase-programmed switch to limit and regulate the surge current loading on an AC power source employed to charge a capacitor energy store. A controller commands the phase-programmed switch, which begins the charging cycle by closing at a predetermined phase relation to the AC source. The same switch is used to interrupt the charging when the desired capacitive energy store voltage is reached.

7 Claims, 9 Drawing Sheets

Source Phase
Relation, Phase
Rotation is
Counter clockwise

FIG. 6B

Source Phase
Relation, Phase
Rotation is
Counter clockwise

REGULATED CAPACITOR CHARGING CIRCUIT USING A HIGH-REACTANCE TRANSFORMER

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

This invention relates generally to the field of pulsed power circuitry, and in particular to charging and regulating capacitor energy stores.

2. Description of the Prior Art

Pulsed power applications are based upon storing a quantity of energy in a capacitor bank by charging it from a prime power source. This energy is subsequently switched out of the capacitor bank in a shorter time than initially required to charge the capacitor bank, thereby achieving a higher peak power.

Circuits used to charge a capacitor store must have a current limiting feature to limit the surge current loading on the source. The nature of this current surge is twofold. One aspect of the surge is related to the capacitor, which, when totally discharged at the beginning of the charging process, is a short circuit. It will, therefore, draw a current from the source limited only by the impedance or other similar characteristics of the charging circuit. The other aspect of the surge is traceable to the starting phase relation of the power source voltage to the closure of the switch or contactor.

The first cycle saturation problem common to all ferromagnetic core transformers is a result of the fact that ferromagnetic core inductors including transformers will saturate if the flux density of the core exceeds the saturation level. For economic reasons ferromagnetic core devices are designed to operate slightly below saturation when the device is in steady state operation. However, when the device is first turned on, by having an AC voltage applied, the transient flux can exceed the steady state flux by a factor of approximately two. The occurrence of this high flux is statistical in relation to the precise time or phase during the AC voltage cycle at which the switch connecting the device to the AC source closes. If the device does not have a saturable core, or the flux does not exceed the saturation level, then the maximum surge is limited to about twice the steady state current. However, if the core is saturable, then typical current surges will be ten to twenty times the steady state value. These large surges can and do cause problems that have been dealt with in a number of ways. If the surge exceeds the circuit breaker trip level then it will open and will have to be reset before attempting a restart. Since the exact closing phase is random, the breaker will not open every time. Typically one might experience a random breaker opening about 5 percent of the time. Sometimes this one in twenty fault is simply tolerated and the procedure is to try again until the circuit holds.

Another method to eliminate the problem is to apply the voltage slowly, i.e., over a period of several cycles of the supply voltage. This provides for a slow build up of the flux in the core and prevents the saturation level from being exceeded. This method requires the use of additional and expensive components to accomplish the slow application of voltage.

A third method is to use two contactors (switches) to accomplish a "step start". The method employs an impedance that is in series with the power source to the device. One contactor is then used to connect the power source to the series impedance. The second contactor is placed across the impedance and is programmed to close a short time after the first contactor. When the first contactor closes the series impedance limits the surge current but permits the device to develop about half of the rated flux. When the second contactor closes, it increases the applied voltage to the device by a factor of about two to the rated input level. The step-start thus provided causes the flux to come up in two small steps with a settling period between rather than one large step with no settling time. The result is a much smaller surge which can be accommodated by the circuit breaker. The disadvantage of this the method is it requires twice as many contactors in addition to the surge limiting impedance. It is, however, less expensive than the equipment required for the previous method of a slow voltage run-up.

In addition to the current surge-limiting feature, the circuit must provide a feature that controls or regulates the maximum voltage to which the capacitor store is charged. This regulation feature must accommodate fluctuations in the prime power source and other parameters that may drift in time due to temperature variations or other factors.

The present state of the art approach for charging and regulating capacitive energy stores is the "switching regulator" type of power supply. The principle of operation consists of directly rectifying the AC main power source to obtain a DC source. The direct rectification avoids the use of a large expensive transformer, only relatively small rectifiers are required. The DC thus obtained is then switched at a high frequency, typically 20 kHz or more, into a small capacitor through an inductor, and then into the primary of a high voltage step-up transformer.

Solid state switching devices such as (Insulated Gate Bipolar Transistors) IGBT's or power (Monolithic Oxide Silicon Field Effect Transistors) MOSFET's are used. The high switching frequency permits the size of the transformer to be greatly reduced in relation to a transformer operating at the power line frequency, i.e. 20 kHz or higher compared to 60 Hz or 400 Hz. The secondary of the transformer connects through a high-voltage rectifier and then to the capacitive store. Each switching cycle of the circuit delivers a measured amount of energy to the capacitive store. The voltage on the capacitive store is sensed and compared to the desired full charge voltage. When that voltage is reached the switching is stopped, thus accomplishing the regulation function. In some variations of this type of switching regulator the frequency of the switching cycle is programmed in such a way as to maintain a more uniform power drain on the primary power line than would be obtained if the switching frequency were constant. Switching regulators work quite well but are complex and expensive. Since IGBTs and MOSFETs have limited power handling limitations, very large numbers of these components and associated circuits are required to handle high energy and/or high average power levels.

SUMMARY OF THE INVENTION

The present invention provides an interface between a prime power source and the capacitive energy store in repetitive pulsed-power machines of all types, including radar, lasers, high-powered microwave systems, and all manner of pulsed transmitters. It provides for the compact, simple, economic, and reliable charging of a capacitor energy store to a predetermined and regulated voltage. A high-reactance transformer is used in combination with a phase-programmed switch to both limit the surge current loading on the source and to achieve voltage regulation. The transformer secondary is rectified and is wound to provide the desired charge voltage on the capacitor store. A controller commands the primary switch that begins the charging cycle by closing at a predetermined phase relation to the prime AC power source. The primary switch is a fast solid-state type, such as a silicon-controlled rectifier (SCR). The primary switch also opens the primary connection at a predetermined voltage on the capacitor store, thus providing the regulation of the charging voltage. The invention can be operated from a single phase, three phase, or poly phase prime power source.

DESCRIPTION OF THE PREFERRED EMBODIMENT

Figure 1:
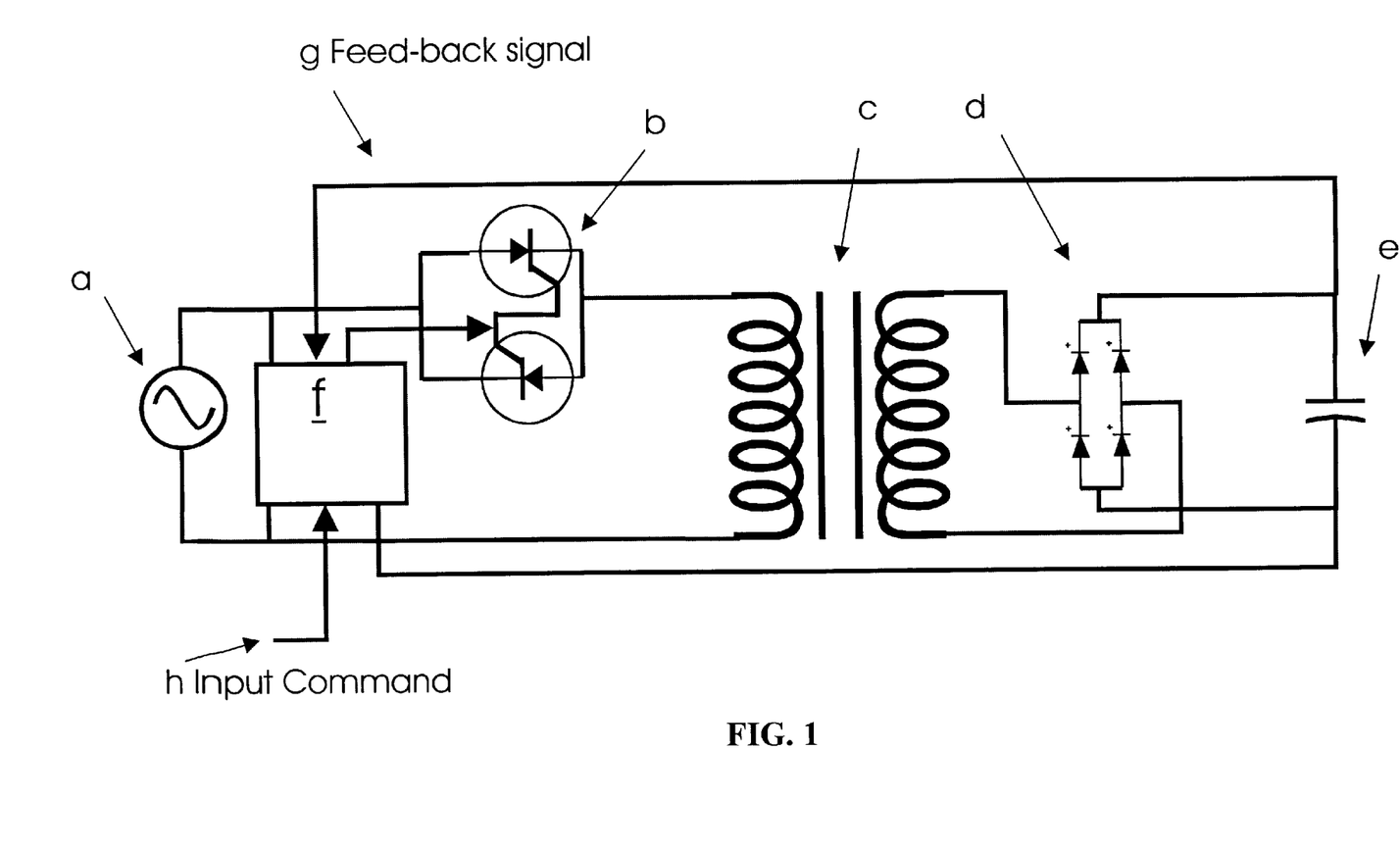
FIG. 1 is a simplified diagram of the invention.

The essential elements of the invention are shown in the simplified schematic diagram of FIG. 1. The first element is an AC (alternating current) (a) power source, such as an electrical service outlet or AC generator. The diagram in FIG. 1 indicates the power source as single phase; however, the invention is also applicable to poly-phase AC power sources. The particular application to poly-phase power is slightly more complicated than single-phase power and is discussed later. An AC switch (b) is used that is capable of turning AC power (a) on and off on command from the controller unit (f). This switch could be a pair of silicon-controlled rectifiers, triac transistors, or any other such device. A high-impedance transformer (c) is used that determines the maximum short circuit current that will load the power source. It also provides a voltage step-up or step-down to accommodate the required voltage level on the capacitive load store (e).

A rectifier assembly (d) converts the secondary AC voltage of the high-impedance transformer into DC (direct current) to charge the capacitive load (e) to the required DC voltage level. The diagram in FIG. 1 shows a full-wave rectifier bridge circuit. However, any of a large number of suitable rectifier circuits may be used to implement the invention. The load is a capacitive energy store to be charge to a pre-determined voltage or energy level.

A sensing and control unit (f) serves several functions. First, it accepts an external input command to begin the operating cycle to charge the load (e). Secondly, it senses the phase of the power source and begins the operating cycle when the single-phase voltage of the source is at a multiple of 90 degrees, i.e., at its instantaneous peak AC voltage. The proper phase relation for a three-phase source will be discussed later. The purpose of selecting the proper phase is to limit the transient surge current extracted from the source. Finally, the control unit (f) senses the load (e) voltage by means of a feedback signal (g) and commands the AC switch (b) to turn off when a pre-selected voltage occurs on the load. Implementation of the control unit is a routine design-engineering task in the field of digital and computer electronics.

The feedback signal (g) communicates the voltage on the load to the sensing and control unit. The feedback signal may be implemented by means of a hard-wire circuit and voltage divider, an optical sensor, a digital sensor or any other means by which the information about the load voltage may be communicated to the control unit.

An input command (h) conveys information to the control unit (f) to begin the charging of the load capacitive store. The input command may also contain information that specifies the voltage to which the load is to be charged. The nature of the input command (h) may be manual or derived from a system controller or other such source depending on the application.

The operation of the invention, as shown in FIG. 1, begins when the control unit (f) receives an input command (h). The input command indicates that the charging process is to begin and also may contain the information as to what voltage level the load is to be charged. The load voltage information could be pre-programmed in the control unit (f), in which case the input command would only provide the instruction to start the charging process.

At the start of the charging process or cycle, the load is initially at zero voltage and presents a short circuit to the system. It is, therefore, essential to limit the short circuit current that reflects to the power source (a). The invention accomplishes the current limiting function in two ways. The high-impedance transformer (c) is the primary means for limiting the short circuit current demand from the source by determining the steady state short-circuit current. However, there is also a transient surge current effect that is determined by the phase of the source voltage in relation to the closing of the switch (b).

The mathematical expression for the relative peak transient surge current is given by the equation.

$$\frac{1}{L} \cdot \int_0^{\pi} \sin(\omega \cdot x + \Phi) dx \quad \frac{1}{L} \cdot \left( \frac{-\cos(\omega \cdot t + \Phi)}{\omega} + \frac{\cos(\Phi)}{\omega} \right) \quad (1)$$

Figure 2:
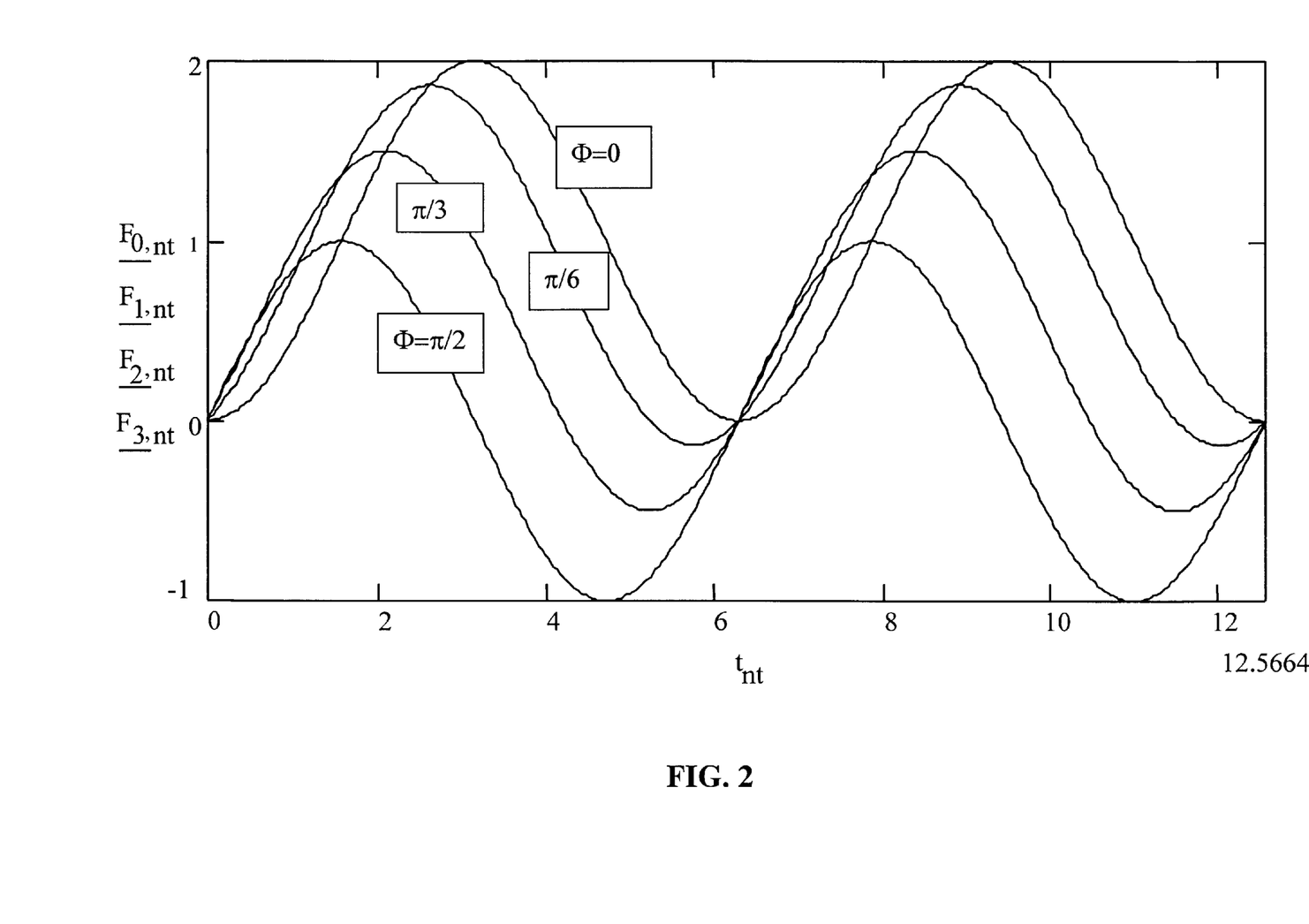
FIG. 2 shows the normalized current transient as a function of the phase angle.

Equation (1), normalized, is plotted in FIG. 2 for two cycles of $\omega$ with four values of phase $\phi$ from zero to $\pi/2$. The maximum relative transient current occurs when the phase is zero. This transient current has a magnitude that is twice the peak value of the peak transient current that occurs when the phase is $\pi/2$. The minimum peak transient current value, at phase $\pi/2$, corresponds to the steady state current. That is, if the switch (b) (FIG. 1) closes when the phase of the voltage is at its peak value ($\phi=\pi/2$) the current transient is eliminated. As can be seen from FIG. 2, the maximum transient current is double the minimum peak surge current and its peak occurs when the source voltage phase is at a zero crossing when the switch closes.

If, however, the switch closes when the input voltage phase is at a maximum, i.e., a multiple of 90 degrees ($\phi=\pi/2$)

for a sine voltage, the transient surge is essentially eliminated by being reduced to a value equal to the steady state short circuit current as determined by the high impedance transformer. It is an essential feature of the invention that the surge current is limited by the controller (f) causing the switch (b) to close at this optimum phase with respect to the source voltage (a). In the case of a three-phase power source there are three angles measured with respect to the source phase that must be maintained to eliminate the transient surge. These phase angles will be defined and explained later.

Figure 3:
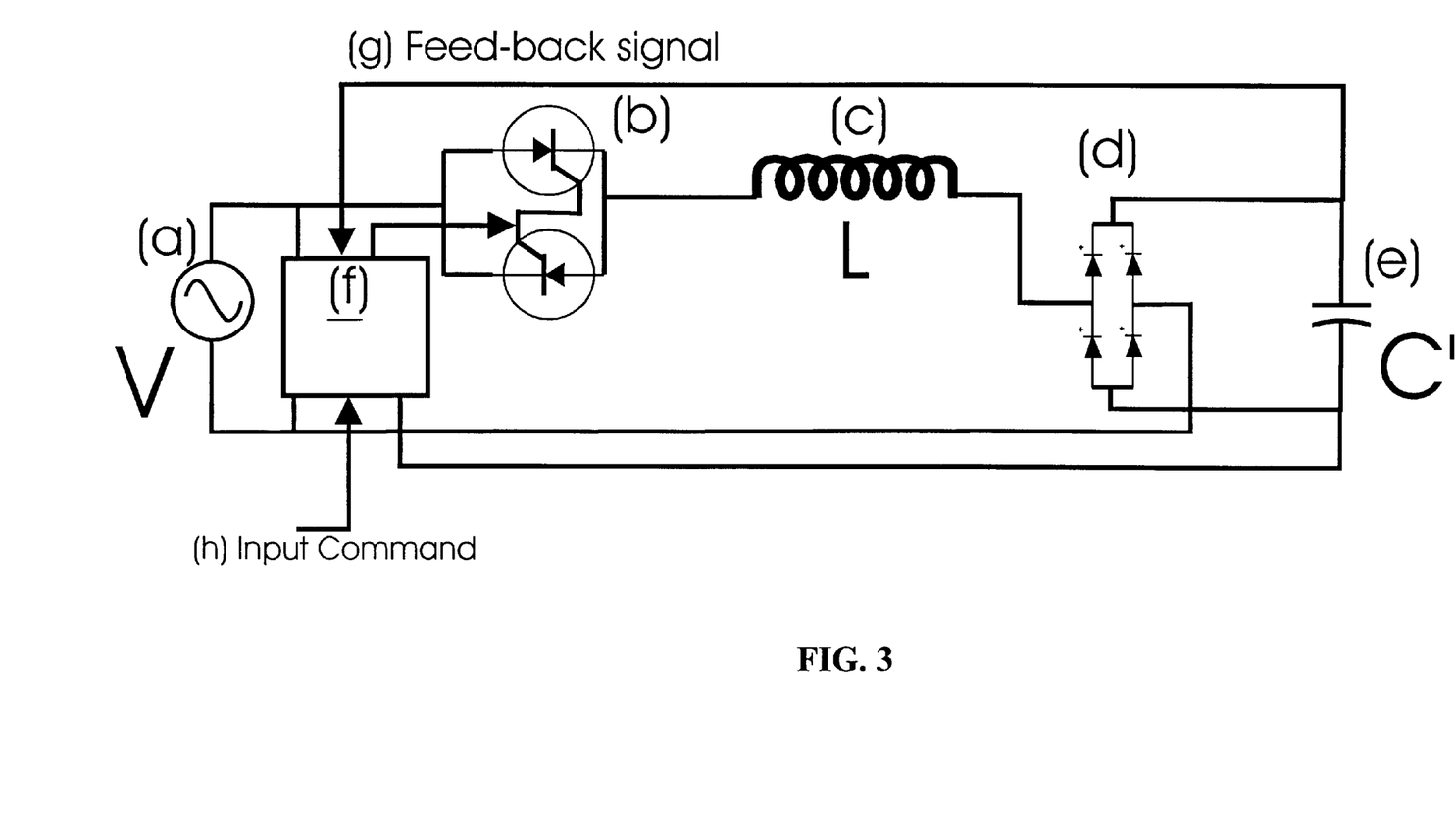
FIG. 3 is the equivalent circuit of the invention.

The transformer is a high reactance type such that the short circuit current is defined in terms of the leakage inductance, L, referred to the primary of the equivalent circuit as shown in FIG. 3. The short circuit root mean squared (RMS) AC line current, Isc, is given by equation (2) as:

$$Isc = \frac{V}{\omega L} \quad (2)$$

The value of C' in the equivalent circuit of FIG. 3 is related to the value of C in FIG. 1 as:

$$C' = C\left(\frac{Vpk}{Vs}\right)^2 \quad (3)$$

where:

V = source RMS voltage at angular frequency $\omega$ radians per second

Vpk = source peak voltage = 1.414*V

Vs = peak voltage to which C (in FIG.1) is to be charged

Initially there is no voltage on the capacitor. Referring to FIG. 3, when the switch (b) is closed, the initial current is limited by the equivalent leakage inductance L of the transformer and the functioning of the controller (f) as explained above. As time progresses the capacitor voltage rises to the required final voltage value, Vs. When the controller senses that Vs has been achieved it commands the switch (b) to open, thus regulating the voltage on the load to the required value.

Figure 4:
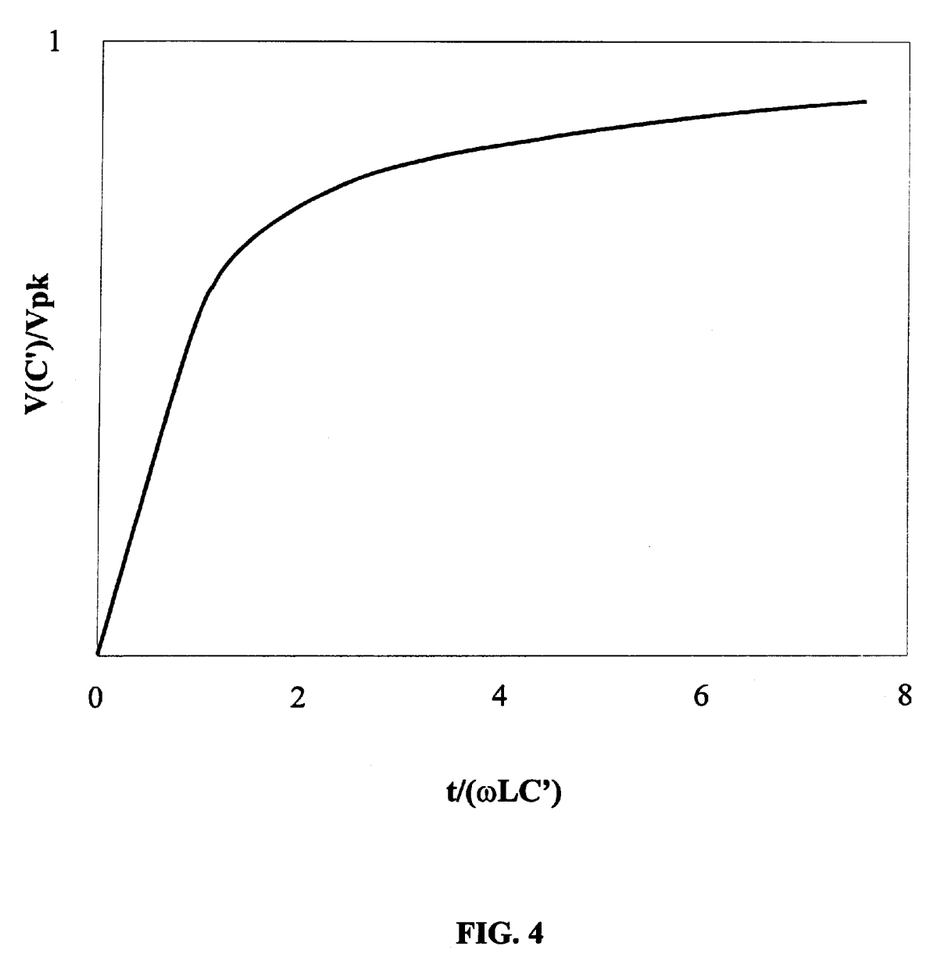
FIG. 4 is a plot of the normalized voltage vs. normalized time for a single-phase power source.
Figure 5:
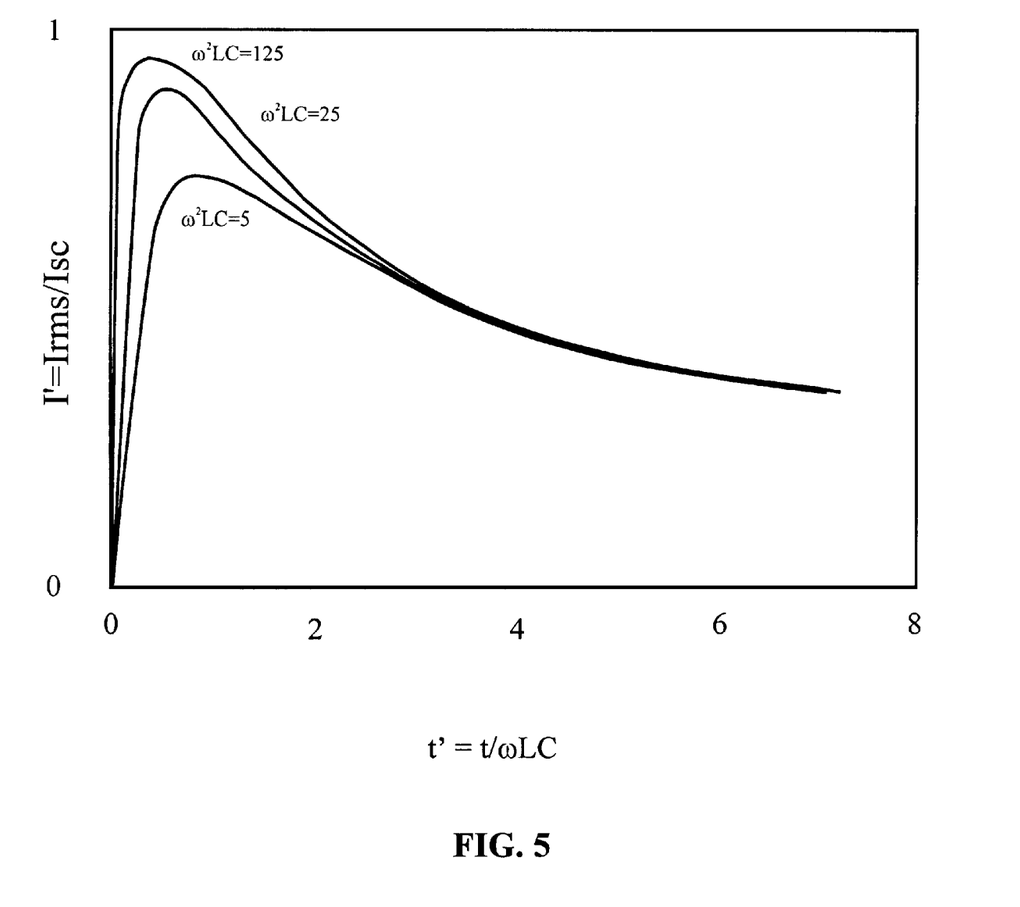
FIG. 5 is a plot of the normalized RMS line current vs. normalized time for a single-phase power source.

In order to apply the invention it is necessary to determine and/or evaluate the performance parameters, specifically the voltage-time characteristic, and the RMS currents such that the transformer design parameters can be specified. The characterization of the invention has been done by extensive circuit analysis and reduced to normalized parameters for design purposes. The characterizations for the single-phase case equivalent circuit are given in FIG. 4 and FIG. 5. These data provide the necessary information for one skilled in the art to design a single-phase implementation of the invention, predict the performance and specify the ratings of the components. FIG. 4 presents the normalized voltage on the load capacitor in terms of normalized time. FIG. 5 shows the normalized RMS line current (primary current) in terms of normalized time and the parameter $\omega^2 LC$. The time normalization parameter in both FIG. 4 and FIG. 5 is $\omega LC$.

The three-phase case is similar to the single-phase case except that the controller must close three AC switches with a specific phase relation to the three-phase power source in order to eliminate the transient current surge. These required phase relations were determined by parametric circuit analysis of three phase circuits. There are two different three phase circuit configurations that may be used, a three-wire source and a four-wire source.

Figure 6A:
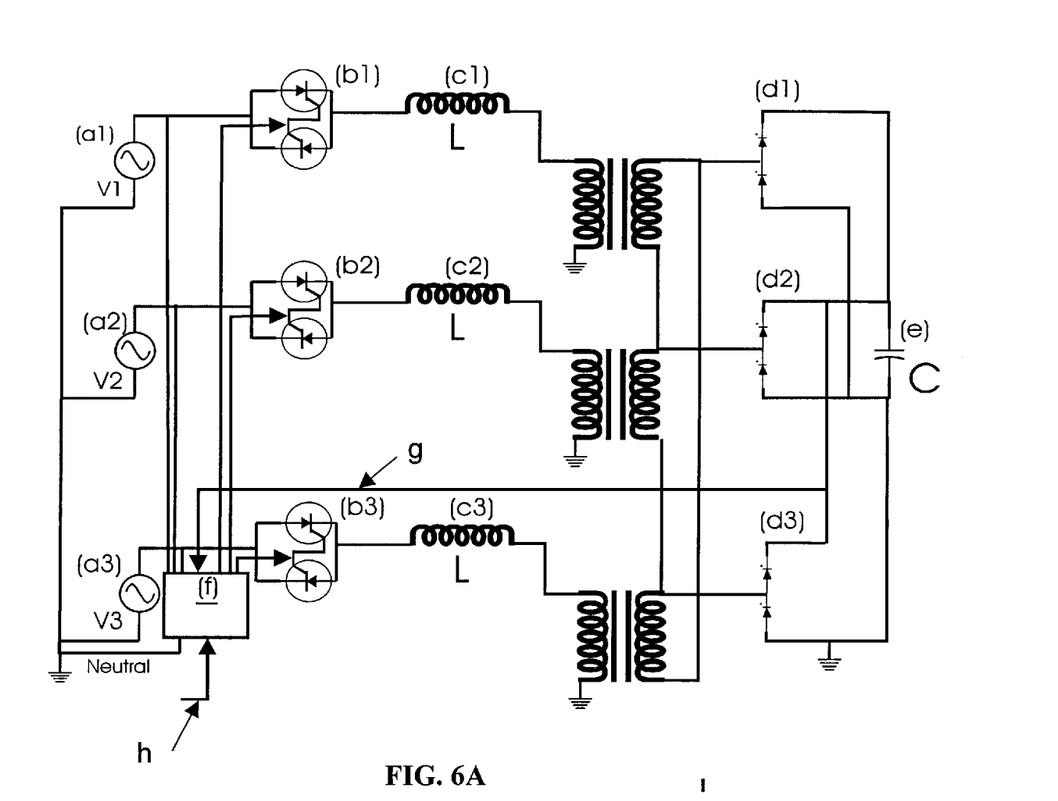
FIG. 6A is a simplified equivalent circuit of the invention for a three-phase 4-wire power source.

The four-wire three-phase source is shown in FIG. 6A and is similar to a thrice duplicate of the single-phase circuit, except for the controller (f) and the feedback signal (g). The source is wye connected with neutral ground, the transformer primary is wye connected with the neutral ground and the secondary is delta connected. The suffix numbers 1, 2 or 3 denote the thrice-duplicated elements. The three phase line to neutral source voltages, (a1), (a2) and (a3) are identified in relative phase as, zero degrees for (a1), minus 120 degrees for (a2) and plus 120 degrees for (a3). That is the sequence (counterclockwise phase rotation) of the three-phase source in 1, 2, 3. The control unit (f) of the invention eliminates the transient surge current by closing the switches (b1), (b2), and (b3) according to the following phase relations. The phase relation of the source voltages is shown in FIG. 6A at the arbitrary time =0. The optimum time for switch (b1) to close is at the phase angle of 90 degrees (approximately). The optimum time for the next switch (b3) to close is at the phase angle of 150 degrees (approximately). The optimum time for the third switch (b2) to close is at the phase angle of −90 degrees (approximately). Notice that the sequencing of the switches is not the same as the electrical sequence 1, 2, 3 but is 1, 3, 2. There are numerous redundant and degenerate specifications of phase sequencing of the switches with respect to different reference phases when the master "close" command is sent to the control unit. These switch-closing phases can be reduced to a logic statement sequence, which would be built into the control unit (f).

The logic sequence statement is: "The controller determines which line to neutral voltage is less than but closest to 90 degrees or −90 degrees. Call this phase n, where n may be 1, 2 or 3. The values of n are determined by modulo arithmetic. That is, if n=3 then n+1=1, n+2=2, n+3=3, n−1=2, n−2=1, etc. If phase n is closest to +90 degrees then the controller will first close phase n when it is at 90 degrees. The controller will next close phase n+2 60 degrees later and then will close n+1, 60 degrees later still. If phase n is closest to −90 degrees then the controller will first close phase n when it is at −90 degrees. The controller will next close phase n+2, 60 degrees later and then will close n+1, 60 degrees later still".

Figure 6B:
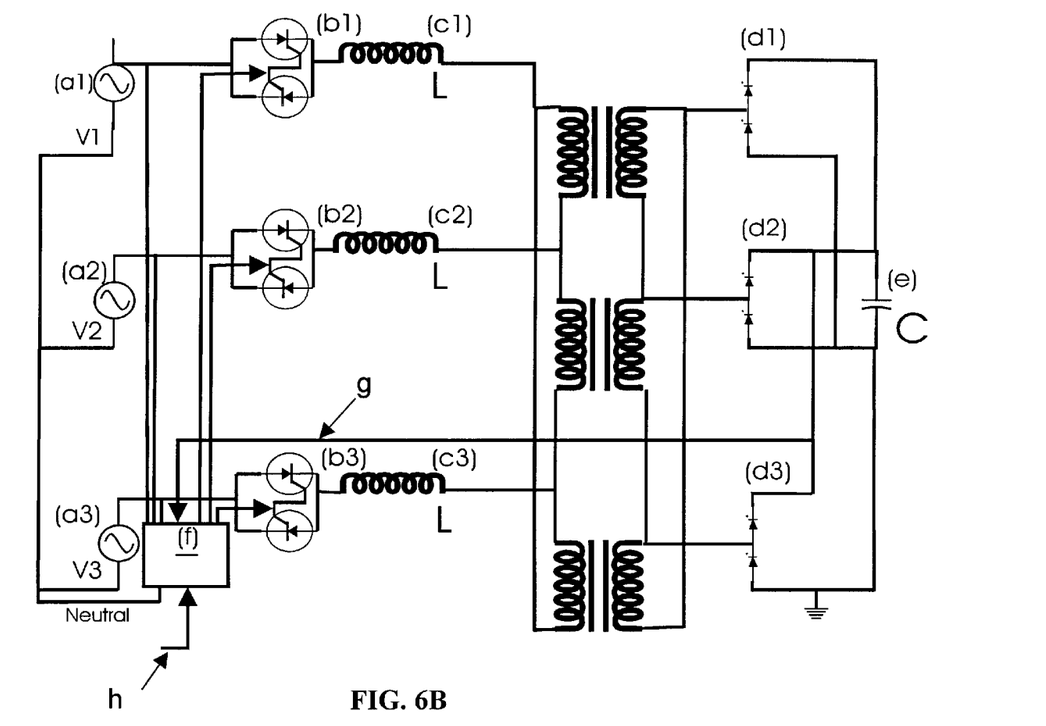
FIG. 6B is a simplified equivalent circuit of the invention for a three-phase 3-wire power source implementation.

The circuit diagram of a three-phase 3-wire configuration is shown in FIG. 6B. There are several significant differences between the 4-wire and 3-wire configurations. The 3-wire circuit does not have a neutral connection that requires that the power transformer be a delta—delta connection. It is also obvious that two of the three switches must be on before power can energize the circuit. Therefore, two switches must close simultaneously to effect the first optimum phase angle, then the third switch is closed to complete the application of power to the circuit. Thus for the 3-wire case there are only two angles to effect the surge elimination process. Referring to the voltage phasor diagram in FIG. 6B, the first optimum angle occurs when the phase of (a12) is 90 degrees. Thus when (a12) is 90 degrees switches (b1) and (b2) are closed simultaneously. Then, switch (b3) is closed 90 degrees later. These optimum angles were determined by extensive circuit analysis for the ideal lossless case with a short-circuited load and with no rectifiers. When rectifiers and losses are added to the circuit a slight change in the optimum angle occurs on the order of about 2 degrees, i.e. to about 88 degrees for (a12) and about 88 degrees later for the second switch. The difference is very slight and could be ignored in most practical cases. Also, as in the 4-wire case there are degenerate cases of the optimum angles depending on which of the line-to-line voltage phases is next in relation to the optimum angle. The logic sequencing statement for the 3-wire case is similar to the 4-wire case except that the voltages referenced are the line-to-line voltages instead of the line to neutral voltages.

The logic sequencing statement for the 3-wire case is: "When the master start charge command is given to the controller, the controller determines which line-to-line voltage phase is less than but closest to 90 degrees or −90 degrees. Call this voltage V(n,n+1), where n may be 1, 2 or 3. The values of n are determined by modulo arithmetic the same as for the 4-wire logic statement. If the phase of voltage V(n,n+1) is closest to 90 degrees the controller will close switches $b_n$ and $b_{n+1}$ simultaneously when the phase of V(n,n+1) is equal to 90 degrees and then will close the switch $b_{n+1}=b_{n+2}$ 90 degrees later in time. If the phase of V(n,n+1) is closest to −90 degrees, then the controller will first close the switches $b_n$ and $b_{n+1}$ simultaneously when the phase of V(n,n+1) equals −90 degrees and then will close the switch $b_{n-1}=b_{n+2}$ 90 degrees later in time".

Figure 7:
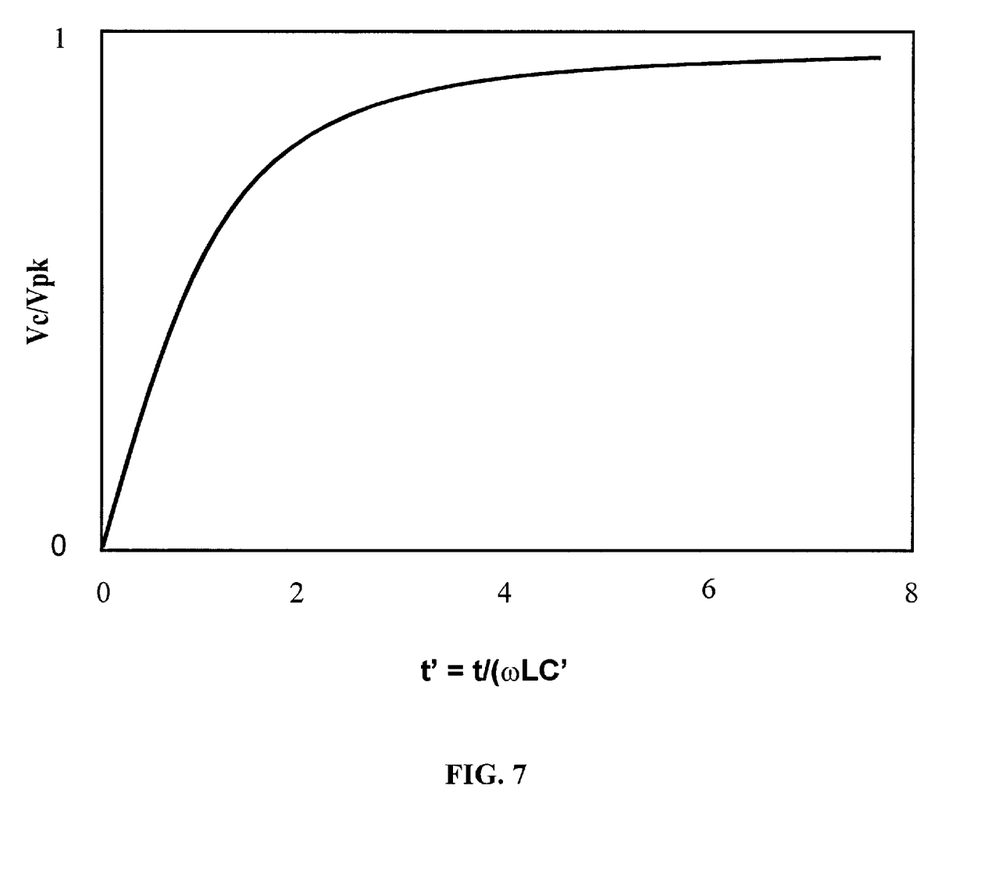
FIG. 7 is a plot of the normalized voltage vs. normalized time for a three-phase power source.
Figure 8:
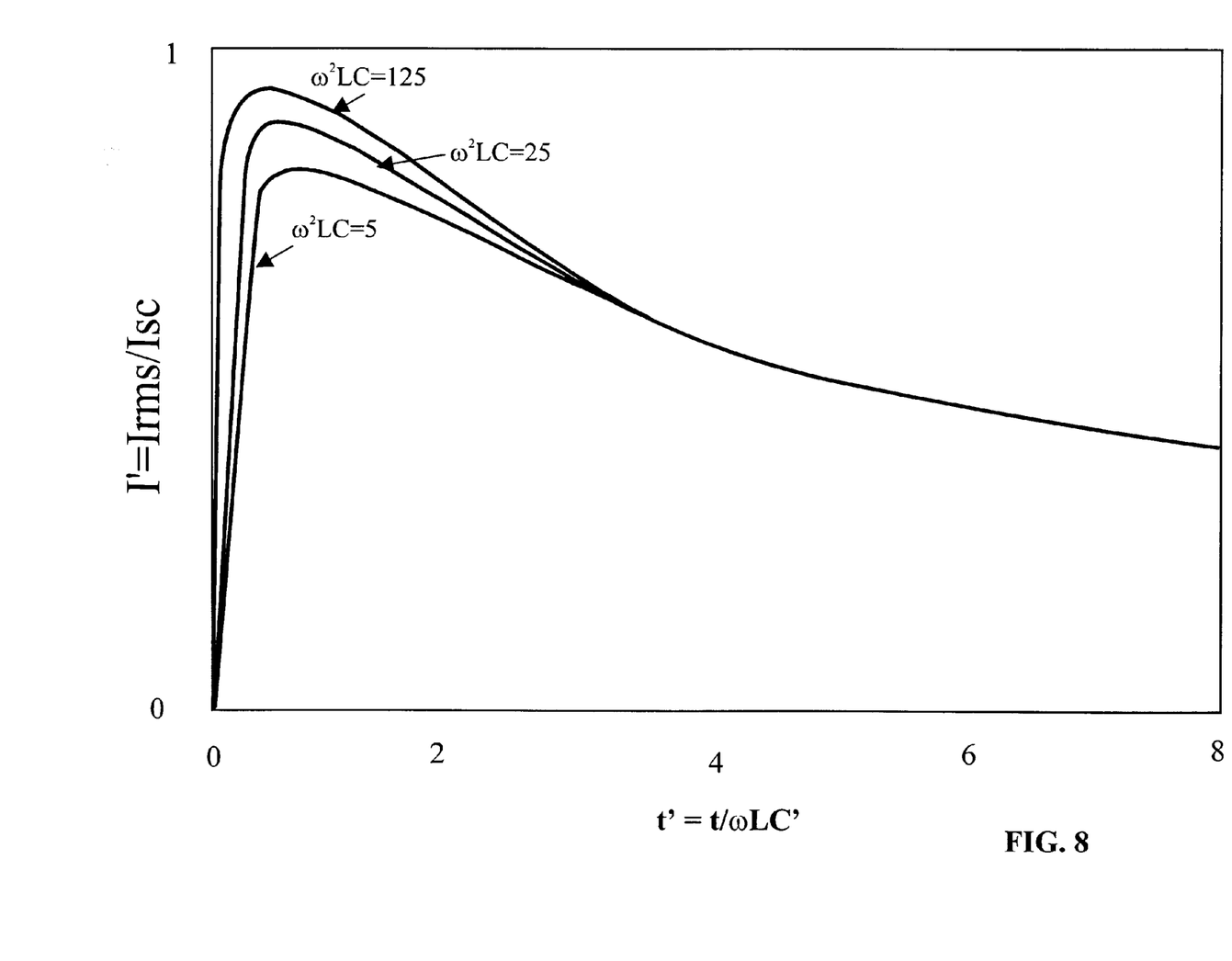
FIG. 8 is a plot of the normalized RMS line current vs. normalized time for a three-phase power source.

The performance characteristics for both the 3-wire and 4-wire configurations are reduced to the same normalized curves shown in FIG. 7 and FIG. 8. The values of L and C are referred to the primary side of the transformer. The data provided is sufficient for one skilled in the art to completely design a specific implementation of the invention and to specify all of the component ratings.

Unregulated and non-optimum surge limited circuits based on high reactance transformers to charge capacitive energy stores for lasers are well known in the art. The addition of the regulation and surge optimization features of the present invention significantly improves the performance of these circuits. The foregoing detailed description is illustrative only and other adaptations, uses, and implementations of the invention will be readily apparent to those of ordinary skill in the art. For example, the phase controlled switch feature of the present invention may be used separately as a "smart switch" to eliminate the first cycle saturation problem, which is common to all ferromagnetic core transformers.

I claim:

1. A capacitor energy store charging system comprising:
   a. a capacitor energy store load to be charged to a pre-determined voltage level;
   b. a single-phase alternating current (AC) power source;
   c. an AC switching means capable of turning the AC power source on and off on command;
   d. a high-reactance transformer means driven by the AC power source whereby the maximum short circuit current that can load the power source is determined and which provides a voltage step-up or step-down to accommodate the required voltage level on the capacitor energy store;
   e. a rectifier means whereby the output of the high-reactance transformer is converted into direct current to charge the capacitor energy store; and
   f. a controller means capable of accepting external input commands, sensing the phase of the AC power source, sensing the voltage of the capacitor energy store, and commanding the AC switching means.

2. The capacitor energy store charging system of claim 1, wherein the controller means starts the operating cycle when the phase of the AC power source is at its instantaneous peak AC voltage.

3. A capacitor energy store charging system comprising:
   a. a capacitor energy store load to be charged to a pre-determined voltage level;
   b. a four-wire, three phase AC power source having three phase line to neutral source voltages of a1, a2, and a3;
   c. three AC switching means b1, b2, and b3 having corresponding three phase line to neutral source voltages of a1, a2, and a3 with relative phases of a1=0 degrees, a2=− 120 degrees, and a3=+ 120 degrees, and each switch capable of individually turning the three phase line AC power sources on and off on command;
   d. three high-reactance transformers means, c1, c2, and c3, driven by the corresponding three phase line to neutral source voltages of a1, a2, and a3;
   e. three rectifier means, d1, d2, and d3 whereby the outputs of the corresponding high-reactance transformers are converted into direct current to charge the capacitor energy store; and
   f. a controller means capable of accepting external input commands, sensing the phase of each of the three phase line to neutral source voltages of a1, a2, and a3, sensing the voltage of the capacitor energy store, and commanding the AC switching means.

4. The capacitor energy store charging system of claim 3, wherein the controller means starts the operating cycle by closing switch b1 when a1 is at an approximate phase angle of 90 degrees, closing switch b3 when a3 is at an approximate phase angle of 150 degrees, and closing switch b2 when a2 is at an approximate phase angle of 90 degrees.

5. A capacitor energy store charging system comprising:
   a. a capacitor energy store load to be charged to a pre-determined voltage level;
   b. a three-wire, three phase AC power source having three phase line to neutral source voltages of a1, a2, and a3;
   c. three AC switching means b1, b2, and b3 having corresponding three phase line to neutral source voltages of a1, a2, and a3, and with relative phase of a1=0 degrees, a2=− 120 degrees, and a3=+ 120 degrees, and each switch being capable of individually turning the three phase line AC power sources on and off on command;
   d. three high-reactance transformers means, c1, c2, and c3, driven by the corresponding three phase line AC power sources, a1, a2, and a3;
   e. three rectifier means, d1, d2, and d3 whereby the outputs of the corresponding high-reactance transformers are converted into direct current to charge the capacitor energy store; and
   f. a controller means capable of accepting external input commands, sensing the phase of each of the three phase line to neutral source voltages of a1, a2, and a3, sensing the voltage of the capacitor energy store, and commanding the AC switching means.

6. The capacitor energy store charging system of claim 5, wherein the controller means starts the operating cycle by closing switches b1 and b2 simultaneously when the phase of voltage phasor a12 is at an approximate phase angle of 90 degrees and closing switch b3 approximately 90 degrees later.

7. A method of charging a capacitor energy store using an AC single-phase power source, a high-reactance transformer, a phase-programmed switch, a rectifier means, and a sensing and control unit means, the method comprising:

a. inputting a command to the sensing and control unit means;
b. sensing the phase of the power source voltage;
c. closing the switch at the power source's instantaneous peak AC voltage, thereby beginning the charging cycle and allowing current to flow to the high-reactance transformer;
d. rectifying the high-reactance transformer output to thereby provide direct current to the capacitor energy store; and
e. continuously sensing the capacitor energy store voltage so that the switch can be opened at a pre-determined voltage level, thereby completing the capacitor charging cycle.

* * * * *